Feb. 10, 1948.   F. R. VAN DER WOUDE   2,435,911
SMALL FRACTIONAL HORSE POWER SHADED POLE SYNCHRONOUS MOTOR
Filed Oct. 29, 1945   2 Sheets-Sheet 1

INVENTOR.
Fritz R. Van der Woude
BY
Frank TT. Slough

Feb. 10, 1948.   F. R. VAN DER WOUDE   2,435,911
SMALL FRACTIONAL HORSE POWER SHADED POLE SYNCHRONOUS MOTOR
Filed Oct. 29, 1945   2 Sheets-Sheet 2
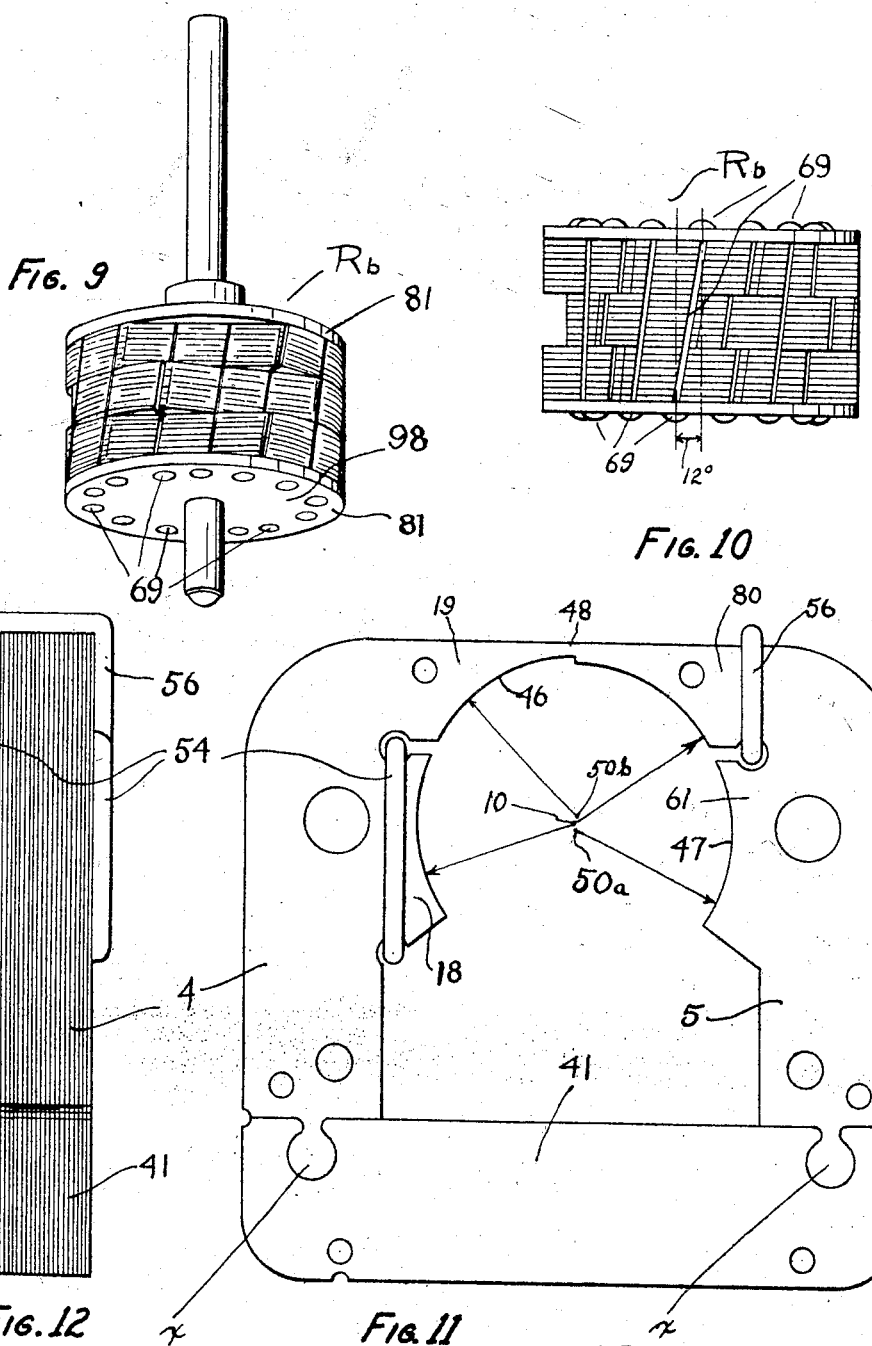
Frity R. Van der Woude, INVENTOR.
BY Frank M. Long Patented Feb. 10, 1948

2,435,911

UNITED STATES PATENT OFFICE 2,435,911

SMALL FRACTIONAL HORSEPOWER SHADED POLE SYNCHRONOUS MOTOR

Fritz R. van der Woude, Elyria, Ohio, assignor to The General Industries Company, Elyria, Ohio, a corporation of Ohio Application October 29, 1945, Serial No. 625,243

9 Claims. (Cl. 172—278)

My invention relates to synchronous motors and relates more particularly to very small motors of the so-called fractional horse power type which are adapted to be used as phonograph motors or other uses requiring a small amount of power and having a high torque self-starting characteristic, being moreover adapted, after starting, to be operated at synchronous speed.

Alternating current motors, of the type more commonly used for phonographs, and sold in a highly competitive market are made much smaller and at lower cost than was formerly considered possible.

Induction motors, presently most commonly employed in said competitive market, operate at speeds determined largely by the currently prevailing load, and this results in the necessity of decreasing the speed reduction ratio as between the rotor and the phonograph turntable from the ratio which would prevail if synchronous rotor speeds could be maintained, but this expedient is more in the nature of a palliative than a cure since the load imposed by the mechanism upon the motor varies considerably during the period of playing of the record.

To improve this situation, governors have commonly been employed in the effort to maintain a constant speed of rotation of the turntable and the incorporation of relatively expensive speed controlling equipment defeats the problem of achieving success by utilization of a low cost asynchronous motor.

However, the action of the governor reacting on the motor creates an objectionable so-called "hunting" or "pulsing" variation of motor speeds, which is objectionable because of the resultant variations in tonal effect communicated to the reproducer of the phonograph as a result of variation in the speed of rotation of the record carried by the phonograph turntable.

It has been previously proposed to employ self-starting synchronous motors to drive phonograph turntables but up to the present time for various reasons those that have been so far produced have been found wanting either because of their relatively high cost or because of lack of proper operating characteristics. No suitable synchronous motor, so far produced, so far as I am aware, which otherwise is adaptable for the driving of a phonograph turntable, can be manufactured to sell at a price which is competitive with the price of the prior and still most commonly used asynchronous motors, those previously proposed synchronous motors, which have come to my notice which most closely approach the low cost of the usual asynchronous motor are found objectionable for various operative reasons.

Such motors have been mechanically objectionable for the reason that they have either failed to be reliably self-starting under conditions of the common relatively heavy starting load, particularly where applied to phonographs equipped with record changing apparatus, which usually adds to the actual static turntable load during the starting period.

Others of such synchronous motors of the prior art have been found objectionable for the reason that the characteristic commonly termed "cogging," which might be likened to the action of a stick in the hands of a small boy progressively snapped against a succession of pickets of a picket fence, causes the rotor speed to be varied during the rapidly recurring "cogging" cycles, and such variations are communicated to the phonograph reproducing stylus with resultant non-desired tonal effects.

A condition which must be made by any motor is that a motor employed to drive a phonograph turntable through friction gearing involving a rubber treaded idler wheel in engagement with the turntable flange, and itself engaged by a small metallic roller carried by the motor shaft, said roller being of such relatively reduced diameter with respect to the diameter of the idler wheel as to effect driving of the turntable with relatively slow rotational speed such as 78 R. P. M., and it being well known that considerable slippage occurs between elements of such friction gearing, being present largely between the rubber tread of the idler wheel and the relatively smaller motor roller.

In order to substantially reduce the amount of slippage between the motor roller and the aforesaid idler wheel in the motor of my invention, I have provided a construction wherein the rotor operates synchronously while rotating at a rate which is equal to ⅓ of the alternations per minute of the energizing alternating current source whereby the motor driving roller may have its diameter increased 50% over such a motor roller which must be employed when the rotational rate of the rotor is equal to the frequency of alternating current employed expressed in complete cycles per second.

Again, under conditions of said cogging effect, said slippage varies in accordance with the cyclic cogging cycles. Efforts have been made to substantially eliminate such cogging effect but commonly this is done at the expense of detracting so much from the tendency of the rotor to operate at synchronous speed that synchronous speed is not reliably achieved.

In the effort to provide a low priced motor of very small size, a rotor speed of 2,400 R. P. M. is the lowest synchronous speed that can be advantageously employed since lower synchronous speeds which are prime fractions of 7,200 R. P. M. if otherwise successfully achieved would require that the motor be of prohibitive size and cost.

The above relationship between rotor speed and the frequency of energizing current while readily attainable in three-phase motor constructions presents more difficulty where the motor is to be operated from an alternating single phase source.

With the motor of my invention rotating at 2,400 R. P. M., and by virtue of the improvements residing therein as herein specified, I have been able to produce a synchronous motor operating at 2,400 R. P. M., employing a satisfactory size of motor roller, and which, while running moderately warm, yet, does not overheat, and is made in a sufficiently small size as to be commercially applicable to the phonograph motor trade, and also by virtue of the said improvements the said motor is reliably self-starting even under severe conditions of starting torque, and quickly comes up to synchronous speed to rotate the rotor at 2,400 R. P. M. which is maintained continuously thereafter, with no discernible cogging effect being set up by the passing of the rotor salient poles of the stator poles.

Although my motor is designed to operate under conditions approaching magnetic saturation, yet only a minimum of magnetic hum which is scarcely discernible results; also, the goal of a relatively low selling price is largely achieved by the fact that the stator field is energized by a single, simply wound, energizing field coil.

The motor illustrated herein as a second but preferred embodiment is of especially rigid construction and possesses advantages with respect to the constraint the closed field exercises upon the ordinarily deleterious magnetic field.

The following are objects of my invention:

To provide an improved self-starting synchronous motor wherein the above objects are severally achieved, which may be started with relatively high starting torque and which is thereafter quickly operative at, and not readily susceptible to departing from, a synchronous operating speed.

To provide an improved rotor, the circumferential portion of which presents three salient poles with intermediate portions wherein the magnetic core material is distributed in such manner as to cause said rotor to reliably start rotating when energized by the improved cooperating field structure under conditions of any and all practical commercial loads encountered in the driving of phonographs for which my improved motor is designed, and said salient poles being so disposed that when said rotor has achieved a rotational speed equal to one-third of the number of alternating current alternations per minute, the effect of said salient poles in cooperation with said field structure will cause said rotor to constantly rotate at said synchronous speed and to so resist cogging effects upon conditions of the higher turntable load as not only to resist stalling, but not to communicate any cyclically fluctuating pulsations of speed to the driven phonograph record supported turntable.

To provide a motor responding to the foregoing objects and each of them and a field core structure therefor which may be readily and quickly assembled and which comprises only two field core parts, wherein the assembled core is of such rigidity that the air gap distance between the faces of the field pole projections and the opposing rotor faces are not varied during the severe conditions whereby use of the motor may maintain a high starting torque and high synchronous speed operating torque for longer periods without readjustment.

To provide a motor of very small size which will be self-starting and which after starting will cause its rotor to be synchronously rotated at rotor speed of 2,400 R. P. M., and when energized from a 60-cycle alternating current will be quieter in operation than the present common type of 60-cycle synchronous motors above referred to.

To provide a motor which will achieve the aforesaid objects and be reliable in self-starting, will maintain a uniform synchronous speed after starting, will be fully efficient as to permit the motor to be made in the small motor sizes previously commonly employed in the aforesaid asynchronous phonograph motors, and which will operate at a synchronous speed of 2,400 R. P. M., from a source of energizing current of 60 cycles per second.

To provide a synchronous phonograph motor for phonographs of the frictional drive type having a synchronous speed of two-thirds the usual speed of prior synchronous motors and therefore, when equipped with a frictional drive affixed to its motor shaft, is capable of employing a rotor of relatively larger diameter than would be required if the synchronous motor speed were fifty per cent greater, and for this reason, a substantial reduction in transmission losses may be achieved when the motor is employed for the above indicated purpose.

To provide an improved low cost single phase self-starting synchronous motor for driving phonograph mechanisms whereof the rotor operates at a speed expressed in revolutions per minute which is equal to two-thirds the number of cycles per minute of the energizing alternating current forces.

To provide certain features of improvement comprising the making of a laminated rotor for a synchronous motor wherein the above objects are achieved, wherein all laminations are of like form and construction.

To provide a synchronous motor of the type which is adapted to operate synchronously at a rotational R. P. M. speed which is equal to one-third the electrical current alternations per minute of the excited alternating current applied thereto which is readily adaptable for low cost quantity production achieved by the usual quantity production methods.

Other objects of my invention, some of which are difficult of concise recital, will be apparent to those who are skilled in the art to which my invention appertains, to wit: the electrical phonograph motor art, by reference to the following specification descriptive of two different embodiments of my invention and to the drawings wherein said embodiments are illustrated.

Fig. 9 is a perspective view of a rotor adapted to cooperatively operate with the stator of the motor of the foregoing figures, or with the improved form of stator as illustrated in Fig. 11;

Fig. 10 is a side elevational view of the rotor of Fig. 9; and

Fig. 11 is a side elevational view and Fig. 12 is an end view of an improved stator with which the rotor of either of the above said embodiments is adapted to be associated.

The illustrated self-starting motor of both embodiments of my invention is operative at a synchronous speed of 2,400 R. P. M. when energized from a 60-cycle alternating current source.

Figure 2:
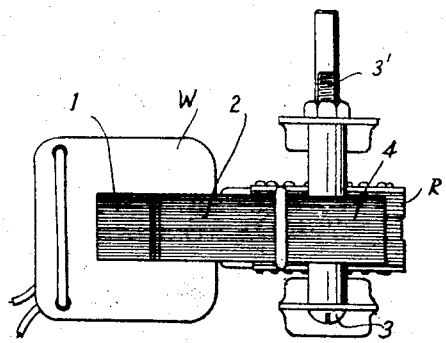
Fig. 2 is a side elevational view of the motor of Fig. 1.
Figure 3:
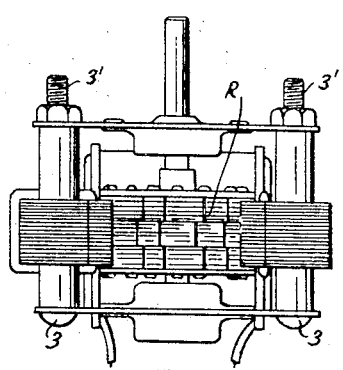
Fig. 3 is an end elevational view of said motor.
Figure 1:
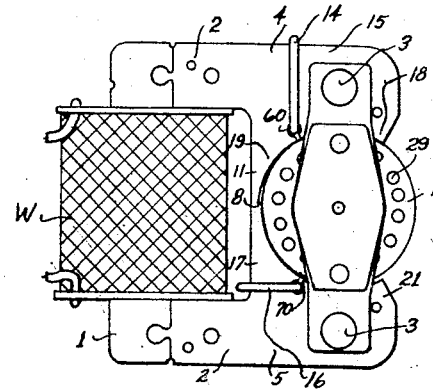
Fig. 1 is a bottom plan view of a self-starting synchronous motor which is an embodiment of my invention.
Figure 4:
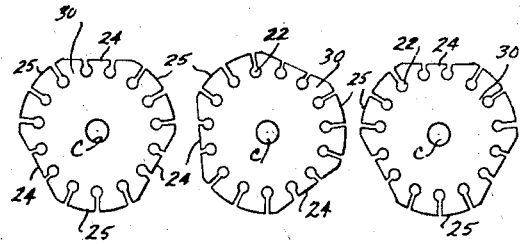
Fig. 4 illustrates the relative positions of three successive stacks of laminations successively positioned in the rotor of the same embodiment.
Figure 5:
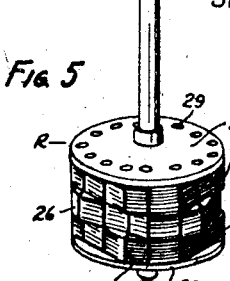
Fig. 5 is an isometric view of the rotor for the motor of the said embodiment.
Figure 6:
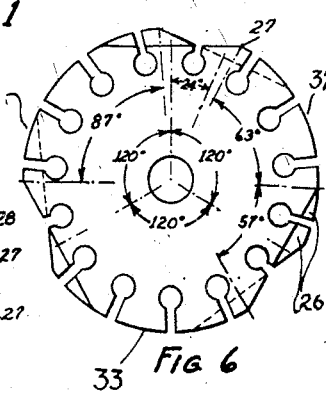
Fig. 6 is a view of three sets of laminations for the rotor of Fig. 5, in their respective operative angular aligned positions, as indicated in Fig. 4.

In the following description, reference will first be had to an embodiment of my invention as illustrated in Figs. 1-7 inclusive, and secondly, to the embodiment of my invention which, for the purpose above set forth, and I personally prefer, which is specifically illustrated in Figs. 9-12 inclusive and Figs. 4 and 6; Fig. 8 is specifically applicable to the said preferred embodiment. Figs. 1, 2 and 3, illustrating a field coil as well as frame, securing and bearing elements, which both embodiments of my invention, in common, are adapted to employ.

Referring now first to Figs. 1 to 7 inclusive, wherein like parts are designated by like reference characters, the field core, as best illustrated in Fig. 6, comprises a pair of field core sections, the first, or yoke section, shown at 1, comprising a plurality of stacked laminations secured together by rivets $x$ projected through aligned-like perforations of the different laminations, and each slightly headed over at each end to keep the laminations of the stack in relatively tightly compressed relation; over the yoke section an energizing winding W is telescoped, said winding being such as to adapt it for energization from a single phase, sixty cycle, alternating current source, of any required operating voltage, and, for the purpose of an example, this description assuming an alternating current of 110 volts, the field winding is preferably of approximately 1,650 turns of wire.

The field core element 2, similarly comprises a stack of a preferably like number of laminations to that of element 1, in superposed relation, the stack being similarly held together by rivets $x$. The element 1 is integrally secured to the element 2 in rigid edgewise abutting relationship by aligned stacked tongues $t$ of element 2, being drive-fittingly projected within the aligned similarly formed slots of element 1.

The field core element 2 is provided with two pairs of laterally extending bolt receiving bores $m$ and $n$ respectively. The bores $m$ are for the purpose of receiving motor mounting bolts, not shown, and the bores $n$ are employed for the passage of bolts 3, utilized to support the motor rotor in place, the ends 3' being also available as motor mounting means.

The core element 2 comprises a pair of field limbs 4 and 5, the first having a pair of pole projections 18 and 19, and the other having pole projections 20 and 21. Of the above, the projections 18 and 20 are shaded, being encircled by closed rings of copper wire 14 and 16, respectively. The unshaded pole projection 20 of the limb 5 is restrictedly joined by its tip 8 to the contiguous tip 11 of the unshaded pole projection 19, the junction being marked by the provision of a short step 33 afforded by the slightly greater thickness of the pole tip 11 over that of the pole tip 8.

These two adjacent pole projections are limitedly joined merely for mechanical convenience in assembly, whereby the pole faces of all pole projections of the limbs 4 and 5 are thus maintained in proper spaced relationship to the circumferential rotor face, later described, during assembly of the motor.

The high magnetic reluctance of the end portion of the reduced shaded pole tip 8 avoids deletory magnetic conductance as between the pole portions 19 and 17.

Figure 7:
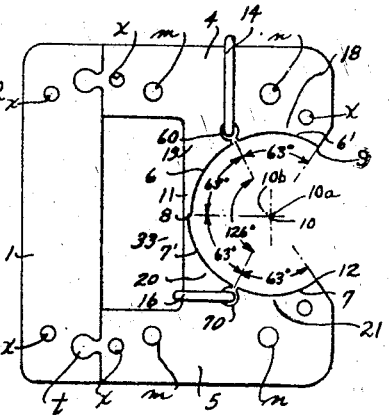
Fig. 7 is a view otherwise like that of Fig. 1 but only showing the field core of the same motor.
Figure 8:
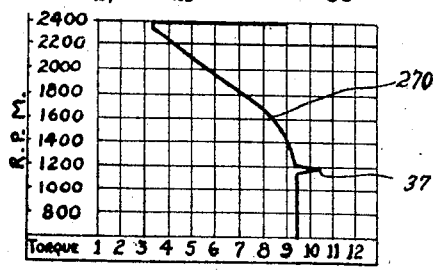
Fig. 8 is a chart showing the relative driving torque exerted by the motor at different motor speeds.

In the embodiment of my invention, as previously actually constructed and operated by me, the height of the step indicated at 33, Fig. 7, is approximately .020".

The height of the step 33 therefore indicates that the most radially outwardly extending end of each of the shaded pole face portions 7' and 6' is approximately .020" further removed from the axis of rotor rotation than are the portions of said pole face portions 7' and 6', which are concentric to the rotor axis, indicated at 10.

The field pole face portions afforded by the field projections 21, 20, and 19, 20, are respectively indicated at 7, 7', 6 and 6'. The shaded face portions 7' and 6' are preferably of arcuate form, all portions thereof being preferably concentric with the axis of rotation 10 of a rotor R, Fig. 5, adapted to be partially embraced by the four pole faces described; preferably, however, the unshaded pole face portions 7 and 6 are initiated by portions 9 and 9' respectively, which are slightly more radially distant from such rotor axis indicated at 10, Fig. 7, than are other portions of said pole faces 7 and 6 proceeding progressively in the clockwise direction, as viewed in Figs. 1 and 7. Said shaded pole faces are generated on separate axes, that for the face portion 6' being indicated at 10a, and that for the face portion 7' being indicated at 10b.

Slots 70 and 60 between unshaded and shaded pole projections are adapted for the reception of shading coils 16 and 14 respectively, each so-called coil in the illustrated embodiment preferably comprising a single loop or convolution of suitable heavy copper wire or bar material, each convolution forming an electrically short-circuited secondary coil element to accomplish the well known shading effect in the encircled field pole projection, in a manner well known in asynchronous motor practice.

As is best shown in Fig. 6, the field core closely embraces 252° of the rotor circumference when said rotor is placed in position with its axis disposed at the point 10; 108° of the peripheral extent of the rotor, as indicated in Fig. 1, extends outwardly beyond any rotor embracing portion of the field pole faces.

The radius of curvature of the 63° sections of the unshaded pole projection face portions in an embodiment of said motor, as constructed by me, is .625", said portions being concentric with the axis of rotation of the rotor indicated at 10, Fig. 7, both shaded and unshaded pole projection face portions extending over arcs of 63° in the said actually constructed embodiment.

The pole projection face portions 7' and 6' are slightly eccentric with respect to said axis of rotor rotation, each being concentric with different one or two axes, each of which, in the described embodiment, being disposed .025" distant from the point 10, said axes being preferably located on separate radii diverging from said point 10 by an angle equal to the field pole pitch of 126°.

The above described method of forming pole faces to provide progressively increased air gaps for shaded pole faces is employed to better favor a predetermined direction of rotation, and to ensure starting of the rotor which rotates on the axis 10.

The stator pole tips 9 and 12 are angularly spaced only 108° since better starting characteristics are achieved, and the otherwise greater stray magnetic field in the vicinity of the pole tips 9 and 12 is more fully utilized by providing a stator pole projection pitch angle of 63° whereby the angular portion of the rotor which is embraced by the stator field is increased over that of certain variant forms of synchronous motors.

The motor constructed as illustrated in the drawings wherein the angle of pole projection pitch is 63° rather than 60° which might seem to be required in quantity production is not required to be constructed with the much greater care, and therefore at greater expense than if the rotor embracing field projections were of lesser extent. By the provision of the 108° gap, the stator imposes upon the rotor a magnetic effect having decided three pole motor characteristics.

The speed of a straight induction motor is determined by the pole pitch of the revolving field, and the rotor reaction.

A conventional squirrel cage rotor, if installed within the above described stator poles, with the correct air gap, will achieve a speed slightly lower than 2,400 R. P. M.; if the same rotor were provided with salient poles to change the rotor reactance on three equally spaced parts of the circumference, then inductive motor action will somewhat increase, but at the same time the reaction motor effect will increase more than the inductive action so that the rotor will lock in at 2,400 R. P. M., when the motor is energized from a 60-cycle source.

In other words, it will run in synchronism with the A. C. source frequency, immediately after the motor has been brought up to the region of 2,340 R. P. M., since the considerable reaction effect will suddenly increase the induction action speed sufficiently that the rotor will be abruptly pulled into step with the synchronous speed of rotation of the rotating field set up by the stator pole projections relatively pitched to produce the 2,400 R. P. M. synchronous speed of rotation, which characterises the field as possessing a tri-polar effect upon the characteristic three pole rotor.

The foregoing description, relating to a stator field construction, relates only to one wherein the rotating field, as determined by the relative pitch of the pole projections which are physically present, will actuate a suitable rotor having three salient poles at the three pole synchronous speed of 2,400 R. P. M.

The rotor R, in the illustrated embodiment best shown in Fig. 4, comprises a plurality of superposed sheet metal stampings 30, all preferably of like form and of the same highly permeable magnetic material, and all are provided with a series of 15 inwardly directed radial slots 22 which terminate, at their inner ends, in a portion 23 whereby preferably 15 straight copper conductor bars 24 may be projected therethrough. The material employed is preferably of the usual kind of permeable non-remanent magnitizable steel, which is adapted to quickly magnetize and demagnetize responsive to rapid periodic magnetizing forces to which it is exposed.

Each of said stampings, though otherwise in the form of a disc, are provided with three equally spaced chordal straight peripheral edge portions 24 which are relatively interconnected by arcuate edge portions 25, also three in number, all portions of the edges 25 being equi-distant from the center of the disc.

Although, in the illustrated embodiment, the stampings are each provided with alternately disposed straight and curved side edges, all straight sides being preferably adapted to be included within equal acute angles of preferably 57°, as defined by radial lines extending from the common axes C and meeting the ends of each said side and all curved sides 25 being preferably adapted to be included in equal acute angles of preferably 63°, defined in the same manner.

Preferably, the straight sides 24 have their medial portion disposed medially of two adjacent openings 22, and each of the arcuate sides has its medial portion disposed medially of that one of three conductor bar slots 22 which is disposed medially of arcuate edge 25.

The above arrangement of slots with respect to the sides while not essential is of some advantage in the embodiment illustrated wherein the rotor comprises laminations each provided with fifteen slots 22, with associated bar receiving openings 23. Other numbers of bars, and varying dispositions thereof, may, however be employed.

The view of Fig. 4 illustrates the relative angular positioning of the stampings of the three stacks in order, the first and third set of stampings being positioned in the same angular relationship, and the intermediate stack being angularly displaced relative to the other stacks.

While all of the stampings are preferably formed precisely alike, the rotative position of a preferably minor number of said stampings, such as one-third of the total number, is displaced angularly with respect to the larger number or remaining two-thirds thereof. In the embodiment illustrated, I prefer that the relative displacement be equal to the angular difference in position of two adjacent slots, or 24°.

Figs. 4, 5 and 6, illustrating the projected peripheral outline of the complete stack of laminations, the intermediate set of seven laminations indicated at 26 being rotatively displaced over an angle of 24°, such intermediate set of laminations affording three radial extensions of the core, indicated at 26, which project radially outwardly beyond the plane of the adjacent straight edged sides of the two sets of laminations between which the intermediate set of seven laminations is positioned. Similarly, the two outer sets present portions 27 which extend radially outwardly beyond the plane of the straight edge sides of the medially disposed angularly displaced set of laminations.

The extensions 26 and 27 are each of approximately triangular form, each triangular portion having one curved and two straight sides, the latter of which, in projection, intersect as at 28. Thus, a "shallow" of greatest depth at 28 is provided in the periphery of the rotor, this "shallow" being repeated in like form at three equally spaced portions of the periphery of the rotor laminations stack.

The angular extent of each said "shallow," as indicated in Fig. 6 for the illustrated embodiment, is 33°, and the angular extent of each of the three interspersed salient poles is shown to be 87°. The rotor is therefore provided with three peripheral, equally spaced salient pole projections comprising a medial portion of maximum field width since such pole face portions comprise aligned curved peripheral portions of all three sets of superposed laminations, and additionally leading and trailing pole face portions are provided, the first comprising two projections 27 of two sets of laminations, and the other comprising projections 26, of merely one set of the rotor laminations.

The pole extensions, shown at 26 and 27 for each salient pole, are provided for the purpose of effecting efficient and relative self-starting of the motor when a single phase alternating current of appropriate voltage is directed through the energizing field coil.

The expedient herein illustrated involving the relative angular displacement of a stacked portion of like rotor laminations with respect to other like laminations facilitates starting of the motor in a proper direction and to effect high torque rotation of the rotor while coming up to speed under load to cause the rotor to rotate at progressively increased speeds, until synchronous speed is so closely approached, as to be immediately and thereafter achieved.

When operated from a 60-cycle alternating current source, the motor of my invention, as herein decribed, will operate synchronously at a rotor speed of 2,400 R. P. M., said speed being determined by dividing the periodicity of the current, expressed in alternations per minute, by the number of rotor poles, or 7,200 divided by 3 to indicate a synchronous speed of 2,400 R. P. M.

This rotational rate arises from the presence in the rotor of three equally spaced peripheral salient pole faces which, when presented to the motor field pole faces, provide a lesser air gap distance between the relatively confronting faces of such pole portions and of said field pole faces to achieve a greater magnetic conductance to the passage of magnetic flux, than is the case of the air gap distance between said field pole faces and the intermediate peripheral portions of said rotor, which afford regions where a much greater air gap distance is effected.

With respect to the embodiment of my invention which I prefer personally, the rotor and field core of the motor thereof are shown in Figs. 9–10, and 11–12, respectively, and it may be noted that these views being somewhat enlarged over the corresponding views of the previously described embodiment, and also that Figs. 9 and 10 are drawn to relatively different scales, which, in turn, from the scale employed in Figs. 11 and 12. Parts such as the mounting frame, bearings, field winding and securing means are like those shown in Figs. 1 to 7 inclusive.

The stator core of Figs. 11 and 12 comprises, as before, two stacks of like stampings of permeable iron or steel, one of which 41 provides the yoke for supporting the energizing field winding w, as shown in Figs. 1 and 2, said stack 41 being interlockingly secured at x to the ends of the magnet core limbs 4 and 5, which are restrictedly united at 48 in the manner of the similar junction at 8 in Fig. 1, but at the extreme ends of the limbs. The two interlocked stacks of lamination stampings provide a generally rectangular core element in external outline but the width of the portion 48 is so limited that the flow of magnetic lines of force from the limb 5 to the limb 4 is substantially negligible.

As in the first embodiment, each limb is provided with two pole projections, those for the limb 4 consisting of a pole 18 shaded by the copper band 54, and an unshaded pole 19, and the limb 5 is provided with a pole 80 shaded by a band 56, and an unshaded pole 61.

Similarly to the previously described embodiment, the arcs of curvature of the non-shaded faces 46 and 47 of the unshaded poles 19 and 61 are respectively formed co-axially with the respective axes disposed at 50b and 50a, whereas both of the arcuate pole faces for the poles 18 and 19 are concentric with the axis 10 which is also the axis of rotation of the rotor, as illustrated in Figs. 9 and 10, and generally indicated at Rb.

The rotor is adapted to be mounted, as illustrated in Figs. 1–3 inclusive, with its circumference disposed in closely spaced magnetic relationship with the above arcuate stator pole faces, and may be first assembled to relatively dispose the three disc stacks similarly to those of the rotor of Fig. 5 whereby three equal stacks of permeable steel discs are superposed, the intermediate stack being rotatively displaced with reference to the laterally disposed stacks and amount indicated in Fig. 4, to afford a circumferential contour like that illustrated in Fig. 6.

As in the foregoing embodiment, fifteen copper bars 69 are threaded through the equally spaced aligned openings, such as 22, Fig. 4, and through fifteen equally spaced apertures of the copper or brass end plate discs 81, the apertures for each disc being arranged in a circle.

As distinguished from the first embodiment, in the rotor of the present preferred embodiment, one of the end discs 81 is then rotated 12° with respect to the other plate, concurrently held stationary, whereby the two discs are relatively rotatively displaced over an angle of 12°.

The protruding ends of the bars are swedged over to form heads and the entire outer surfaces of both said discs, one of which is shown at 98, Fig. 9, is then preferably exposed to a soldering operation whereby the headed over bar ends and the outer surfaces of said discs are rigidly integrally secured together with the end discs tightly compressing the rotor laminations disposed between the discs.

In this, or any equivalent manner, the edges of the lamination segments are skewed and maintained in such skewed form wherein the rotor bars extend diagonally from an end disc to the opposite end disc and are not parallel to the axis of rotation as the rotor of the first described embodiment; at the same time, however, said bars are disposed within the same cylindrical space concentric with the rotor axis, as in said first embodiment.

The amount of skewing which I prefer and which achieves the best results for the kind of work the motor must accomplish may be accurately ascertained by reference to the circumferential spacing between adjacent ends of any pair of said bars, as indicated at 69 in Fig. 10, wherein it is shown that a leading portion of said bar at one end of the laminated portion of the rotor is circumferentially disposed 12° in advance, on said circumference, of the trailing end of the same bar.

The practical effect of the skewing is to slightly increase the asynchronous quality of the motor while better constraining the flow of magnetic lines of force passing from the leading and trailing edges of the stator pole faces which, otherwise, could be characterised as "stray" lines of force. By skewing the rotor laminations and short-circuiting bars over an angle of 12°, a smoother rotation of the rotor, without noticeable "cogging" effects, is achieved, as compared to other constructions, and, to some extent, as compared to the construction employed in the first described embodiment where the staggering of salient pole rotor faces is alone relied upon.

As previously stated, the rotor laminations are preferably the same as those shown in Fig. 4 wherein representative attitudes of the laminations of the three stacks are illustrated in the different rotative attitudes and though, as stated, the stacks of laminations are preliminarily superposed to achieve the relative rotative positions shown in Fig. 6, the subsequent skewing increases the extreme circumferential extent of each salient rotor pole face, but, at the same time, the effective average width of such pole face is decreased.

The effect of the 12° skewing is to slightly advance the rotor salient pole face portions which are nearest one side of the rotor with respect to the corresponding portions disposed at the other side of the rotor relative to other portions contiguous to the same one of the copper bars 69.

The circumferential extent, being indicated as being 12° in Fig. 10, therefore the rotor salient poles which, in the first embodiment had a circumferential span of 87°, in the second embodiment have a circumferential span of 99°, each salient pole face, however, has an average width precisely equal to the average width of a corresponding pole face of the rotor, as shown in Figs. 3 and 5 for the first described embodiment.

Not only are the average width of the rotor pole faces in both embodiments equal, but the average circumferential extent of all portions of the rotor pole faces are equal, but not to such an extent as to substantially reduce the tri-polar characteristic of the motor which causes the motor to continuously rotate at synchronous speed after the momentary starting period, at the end of which synchronous speed is achieved.

The strong increase in torque effect at synchronous speed is indicated by the graphic curve of Fig. 8 which, at 2,400 R. P. M., becomes a straight line 77 leading in the direction of highly increased torque.

The motor of my invention, as above illustrated and described, while applicable to other uses, in view of its high torque starting characteristics, has a particular application to such uses as the driving of a phonograph mechanism including the record supporting turntable thereof, as is shown by the performance curve in Fig. 7, which more particularly relates to the above described second embodiment, wherein the ordinates proceeding from left to right represent equal additional values of torque and the abscissa represents revolutions per minute of the motor rotor.

Assuming that the minimum torque required to drive a given phonograph mechanism is of the order of slightly more than two units of torque, the performance curve 270, at the bottom of the chart, shows a high starting torque at a very low motor speed. At about 1,400 R. P. M., decrease in torque for a range of higher motor speeds is initiated, which continues until a motor speed of from 2,320 to 2,340 R. P. M. is reached, the torque remaining substantially constant until the synchronous motor speed of 2,400 R. P. M. is nearly reached, whereupon the torque produced is greatly increased with the motor operating synchronously at uniform speed.

An analysis of the above curve reveals that the torque is greatest when greatest torque is needed during the initial part of the period of motor operation when the inertia of the relatively heavy turntable must be overcome to initiate rotation of the turntable, thereupon turntable and motor rotation progresses at constantly increasing speeds; the motor rapidly builds up rotational speed until a motor speed of 2,400 R. P. M. is closely approached, whereupon the reaction torque effected by the provision of the salient poles snaps the rotor into synchronism with the rotating field, and the motor is operated synchronously and, then being "locked in" at such synchronous speed, the motor is capable of delivering a considerable amount of power which is more than sufficient to maintain the mechanism in operation, at synchronous speed, even though the amount of load is subject to the maximum commercial variations. In the torque curve, the sub-synchronous effect, shown at 27, at 1,200 R. P. M. which is one-half of the true synchronous rate is noticeable, but ineffective.

It is, of course, apparent that the small type synchronous motor of my invention will not be of high efficiency on the basis of the electrical power delivered to the motor as compared with the power output, but this is of little consequence in the case of low power motors of the class here involved, the important qualities being low cost of production, and proper torque characteristics to cause it, at all times, to operate properly under the complete range of highly variant loads, imposed at different times during the operation of a home-type record-changing phonograph.

The stator of the second embodiment of my invention provides for a closure at both ends of the limbs 40 and 50 of the stator core, said limbs being bridged at one end by the field magnet supporting yoke 41 and at the other end by the core portions 78 and 79 which are restrictedly connected at 48 and which restricted connection is of full width proceeding transversely of the core laminations, although being diminished to a very small dimension in the direction at right angles thereto.

By placing the bridge 78—48—79 at the extreme ends of the stator core limbs, the amount of stray magnetic lines of force are minimized and which, in the first said embodiment, were inclined to be more effected by steel or metal parts such as the phonograph frame near which said motor is required to be mounted, in the second described embodiment wherein the core limbs are more positively and rigidly maintained in their proper relative positions by so placing the bridge as shown in Figs. 11 or 12, than as illustrated in Fig. 1.

Although different figures of the drawings are shown according to various dimensional scales, the actual sizes of the rotor and stator parts are dominated by the small air gap distance known to be required as between the arcuate stator poles and the arcuate confronting salient poles of the rotor and the intent of this disclosure is to describe two differing stator constructions and two differing rotors which with respect to either embodiment may be interchangeable and by this fact, the present disclosure is actually of four different embodiments and may be effected by interchanging the rotors of the two described embodiments.

Having described my invention as applied to different motor constructions providing different embodiments but in all of which a single energizing field winding is employed, and the disclosure being limited to self-starting synchronous motors having a tri-polar synchronous speed effect but without the necessity of employing a distributed two-phase field winding at much greater cost, and wherein objectionable noticeable "cogging" effects are produced at synchronous speed, and which can be mounted in a very small space being of quite small size and yet sufficiently powerful, and adapted to be operated from an alternating single phase source, it will be obvious from the foregoing that further variants from the embodiments herein illustrated and described may be constructed but within the purview of my invention as distinguished from the prior art.

I claim:

1. A phonograph motor operable from an energizing source of single phase alternating current, comprising a stator core having a yoke, a tubular type of magnet winding telescoped over said yoke, a pair of core limbs each extending in the same general direction from the yoke, a pair of pole projections extending inwardly from each pole limb, each said projection provided with a substantially arcuate pole face and said faces together defining a rotor receiving recess of a combined arcuate extent of 252°, shading bands encircling alternate of said projections, the intervening projections being substantially unshaded, and a rotor of the short-circuited squirrel cage type comprising a stack of laminations of magnetizable non-remanent material so disposed in said recess that substantially about 70% of the rotor circumference is disposed inside of the outermost bounds of said stator recess, the rotor axis being substantially co-axial with the arcuate shaded pole faces, and the peripheral edges of the laminations of said rotor stack being formed and disposed as to provide three equally spaced salient pole projections provided with concentric pole faces, and a core "shallow" portion interposed between each adjacent pair of said salient projections, the total circumferential extent of the rotor salient pole faces being at least 87°.

2. A phonograph motor operable from an energizing source of single phase alternating current, comprising a stator core having a yoke, a tubular type of magnet winding telescoped over said yoke, and a pair of core limbs each extending in the same general direction from the yoke, said limbs being integrally joined together at their end portions most remote from said yoke and being of considerably diminished cross sectional area at such junction, a pair of pole projections extending inwardly from each pole limb, each said projection provided with a substantially arcuate pole face of an approximate arcuate extent of 63° and said faces together defining a rotor receiving recess, shading bands encircling alternate of said projections, the intervening projections being substantially unshaded, and a rotor of the short-circuited squirrel cage type comprising a stack of laminations of magnetizable non-remanent material so disposed in said recess that approximately 30% of the rotor circumference is disposed outside of the outermost bounds of said stator recess, the rotor axis being substantially co-axial with the arcuate shading pole faces, and the peripheral edges of the laminations of said rotor stack being so formed and disposed as to provide three equally spaced salient pole projections provided with concentric pole faces and a core "shallow" portion interposed between each adjacent pair of said salient projections, the circumferential extent of the rotor salient pole faces being at least 87°, said core limb junction being interposed between a shaded pole projection of one of said limbs and an unshaded pole projection of the other limb, both of said shaded pole faces being arcuately concentric with the axis of rotation of said rotor, each of the intervening unshaded stator pole faces being arcuately so formed that the air gap distance of the portion of each said face which is disposed nearest the shaded pole of the same core limb is disposed at approximately the same radial distance from the axis of rotor rotation as said shaded pole face and portions thereof disposed more remote from the said shaded pole face are disposed at progressively greater radial distance from said rotor axis.

3. A phonograph motor operable from an energizing source of single phase alternating current, comprising a stator core having a yoke, a tubular type of magnet winding telescoped over said yoke, and a pair of core limbs each extending in the same general direction from the yoke, a pair of pole projections extending inwardly from each pole limb, each said projection provided with a substantially arcuate pole face of an approximate arcuate extent of 63°, and said faces together defining a rotor receiving recess, shading bands encircling alternate of said projections, the intervening projections being substantially unshaded, and a rotor of the short-circuited squirrel cage type comprising a stack of laminations of magnetizable non-remanent material so disposed in said recess that approximately 30% of the rotor circumference is disposed outside of the outermost bounds of said stator recess, the rotor axis being substantially co-axial with the arcuate shading pole faces, and the peripheral edges of the laminations of said rotor stack being so formed and disposed as to provide three equally spaced salient pole projections provided with concentric pole faces and a core "shallow" portion interposed between each adjacent pair of said salient projections, the circumferential extent of the rotor salient pole faces being at least 87°, both of said shaded pole faces being arcuately concentric with the axis of rotation of said rotor, each of the intervening unshaded stator pole faces being arcuately so formed that the air gap distance of the portion of each said face which is disposed nearest the shaded pole of the same core limb is disposed at approximately the same radial distance from the axis of rotor rotation as said shaded pole face and portions thereof disposed more remote from the said shaded pole face are disposed at progressively greater radial distance from said rotor axis.

4. A phonograph motor operable from an energizing source of single phase alternating current, comprising a stator core having a yoke, a tubular type of magnet winding telescoped over said yoke, a pair of core limbs each extending in the same general direction from the yoke, a pair of pole projections extending inwardly from each pole limb, each said projection provided with a substantially arcuate pole face and said faces together defining a rotor receiving recess of a combined arcuate extent of 252°, shading bands encircling alternate of said projections, the intervening projections being substantially unshaded, and a rotor of the short-circuited squirrel cage type comprising a stack of laminations of magnetizable non-remanent material so disposed in said recess that 30% of the rotor circumference is disposed outside of the outermost bounds of said stator recess, the rotor axis being substantially co-axial with the arcuate shaded pole faces and the arcuate non-shaded faces being formed on separate axes disposed eccentrically of said rotor axes, and the peripheral edges of the laminations of said rotor stack being formed and disposed as to provide three equally spaced salient pole projections provided with concentric pole faces, and a core "shallow" portion interposed between each adjacent pair of said salient projections.

5. The phonograph motor substantially as set forth in claim 1 characterised by the rotor laminations being of disc form with three equally spaced portions of the edges cut away, the remaining arcuate portions being of somewhat greater angular extent than said cut-away portions and said laminations being initially grouped into a plurality of stacks, certain of said stacks being fixedly rotatively displaced from the other stacks.

6. The phonograph motor substantially as set forth in claim 4 characterised by the rotor laminations being of disc form with three equally spaced portions of the edges cut away, the remaining arcuate portions being of somewhat greater angular extent than said cut-away portions and said laminations being initially grouped into a plurality of stacks, certain of said stacks being fixedly rotatively displaced from the other stacks, all of the laminations of all of said stack portions after assembly being skewed so as to rotatively displace the laminations of each stack portion progressively more and more proceeding from one side of the complete stack to the other side, the maximum amount of skew between the first lamination at one side of the stack and the last lamination at the other side of the stack being approximately 12°, the aggregate effect of said displacement and said skew being to provide tip portions of each rotor salient pole and to circumferentially space a leading tip portion of each salient pole from the trailing tip portion of said pole over an angle of approximately 99°.

7. The phonograph motor substantially as set forth in claim 4 characterized by each of the rotor salient pole faces having a circumferential extent of approximately 87° and having a trailing portion, a middle portion, and a leading portion, said trailing portion of one-half the effective width of said leading portion and one-third the effective width of the middle portion.

8. The phonograph motor substantially as set forth in claim 1 characterized by said stator limbs being integrally joined together at their end portions most remote from said yoke and being of considerably diminished cross sectional area at such junction.

9. A small fractional horse power motor operable from an energizing source of single phase alternating current, comprising a stator core having a yoke, a tubular type of magnet winding telescoped over said yoke, a pair of core limbs each extending in the same general direction from the yoke, a pair of pole projections extending inwardly from each pole limb, each said projection provided with a substantially arcuate pole face and said faces together defining a rotor receiving recess of a combined arcuate effective extent of 252°, shading bands encircling alternate of said projections, the intervening projections being substantially unshaded, and a rotor of the short-circuited squirrel cage type comprising a stack of laminations of magnetizable non-remanent material so disposed in said recess that 30% of the rotor circumference is disposed outside of the outermost bounds of the effective portion of the stator projections, the rotor axis being substantially co-axial with the arcuate shaded pole faces and the arcuate non-shaded faces being formed on separate axes disposed eccentrically of said rotor axes, and the peripheral edges of the laminations of said rotor stack being formed and disposed as to provide three equally spaced salient pole projections provided with concentric pole faces, and a core "shallow" portion interposed between each adjacent pair of said salient projections.

FRITZ R. VAN DER WOUDE.

REFERENCES CITED

The following references are of record in the file of this patent:

UNITED STATES PATENTS

| Number | Name | Date |
|---|---|---|
| 1,884,140 | Nickle | Oct. 25, 1932 |
| 1,892,552 | Holtz | Dec. 27, 1932 |
| 1,915,069 | Morrill et al. | June 20, 1933 |
| 1,945,028 | Almaine et al. | Jan. 30, 1934 |
| 2,121,699 | Jansen | June 21, 1938 |
| 2,122,374 | Kohlhagen | June 28, 1938 |